3,589,877
GASOLINE ANTI-ICING
Lawrence J. Balash, Southfield, Mich., assignor to
Ethyl Corporation, New York, N.Y.
No Drawing. Filed Apr. 7, 1967, Ser. No. 629,105
Int. Cl. C10l 1/28
U.S. Cl. 44—63                                    8 Claims

ABSTRACT OF THE DISCLOSURE

Gasoline containing, as an improved anti-icing additive, the combination of a substituted tetrahydropyrimidine, an amide or mixtures thereof and an organic silicon compound. Examples of the tetrahydropyrimidine and amide are 1-octadecenyl-2-methyl-1,4,5,6-tetrahydropyrimidine and N-(2-aminoethyl)-N-heptadecenylacetamide. Examples of suitable organic silicon compounds are polyhydrocarbylsiloxanes and alkyl silicates.

BACKGROUND OF THE INVENTION

The tendency of gasoline fueled internal combustion engines to stall due to carburetor icing is well known. This stalling contributes to reducing the overall efficiency of engine operation. Where the engine powers an automobile, it may also be a safety hazard.

Gasoline additives which will reduce this tendency of the carburetor to ice are available. New and improved anti-icing additives, however, are always in demand.

SUMMARY OF INVENTION

This invention relates to the synergistic interaction of an organic silicon compound and a substituted tetrahydropyrimidine or amide in gasoline to effect improved anti-icing characteristics. It further relates to a method of reducing the stalling due to ice formation in the carburetor of a gasoline fueled internal combustion engine. It also relates to a combination of an organic silicon compound and a substituted tetrahydropyrimidine, an amide or mixture thereof, as a new gasoline additive.

DESCRIPTION OF THE PREFERRED EMBODIMENTS

An object of this invention is to provide a gasoline composition with improved anti-icing characteristics. Another object of this invention is to provide a new gasoline additive anti-icing composition. These and other objects of this invention will be made apparent from the following description and claims.

An embodiment of this invention is a gasoline containing as an anti-icing additive the combination of
(a) An organic nitrogen compound selected from
(i) tetrahydropyrimidines having the formula

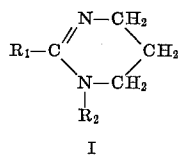

I and
(ii) amides having the formula

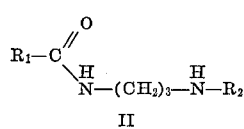

II and

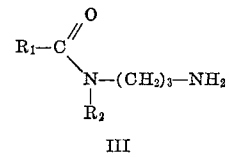

III wherein $R_1$ and $R_2$ are independently selected from alkyl and alkenyl radicals of up to about 20 carbon atoms, and
(iii) mixtures of the (i) tetrahydropyrimidines and (ii) amides and
(b) Organic silicon compounds selected from the class consisting of silicones and silicates.

Another embodiment of this invention is the gasoline described above wherein the concentration of said organic nitrogen compound is from about 25 to about 50 parts per million and said organo silicon compound is from 5 to about 15 parts per million all parts by weight.

Preferred embodiments of this invention are gasolines described above wherein the organic silicon compounds are selected from (a) silicones having the formula

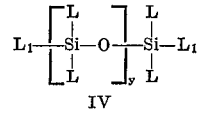

IV wherein L is independently selected from $C_1$ to $C_{12}$ alkyl groups and $C_6$ to $C_{10}$ aryl groups and y is an integer from 1 to about 20 and $L_1$ is selected from L as defined above and the hydroxyl group and (b) silicates having the formula

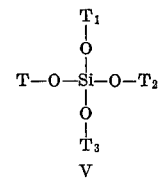

V wherein T, $T_1$, $T_2$, and $T_3$ are independently selected from $C_1$ to $C_{12}$ alkyl groups. More preferred embodiments of this invention are gasolines described above wherein the organic silicon compound is a silicone having Formula IV wherein (1) L is methyl and y is 1 to about 5 and (2) L and $L_1$ are methyl and y is 1.

Especially preferred embodiments are the more preferred gasolines described above wherein said organic nitrogen compounds are mixtures of tetrahydropyrimidines (Formula I) and amides (Formulae II and III) wherein $R_1$ is methyl or $C_{17}$ hydrocarbon alkyl and $R_2$ is octadecenyl.

The organic nitrogen compounds which are useful in this invention are readily obtained by reacting a suitable organic acid with a polyamine. This reaction involves the elimination of water between the acid and the amine. When one molecule of water is split out, linear amides such as those represented by Formulae II and III are obtained; if the condensation is carried out so that two molecules of water are eliminated, the tetrahydropyrimidines having Formula I are obtained. Methods of preparing these tetrahydropyrimidines and amides are well known. A typical preparation is presented in Example 1 below.

Various acids and various amines may be used to prepare these tetrahydropyrimidines and amides. The tetrahydropyrimidines and amides therefore will be described in terms of the acids and amines used to prepare them.

Acids which are useful in the preparation of these organic nitrogen compounds are carboxylic acids having up to about 20 carbon atoms. Examples of these acids are acetic acid, eicosanoic acid, lauric acid, octanoic acid, and the like. Unsaturated organic acids having from 10 to about 20 carbon atoms are also useful. Examples of these acids are $\Delta^{9,10}$-decenoic, oleic acid, linoleic acid, gadoleic acid and the like.

Other useful acids are those commonly obtained as hydrolysis products of natural materials. The acids so obtained are usually mixtures containing other organic acids. Thus, for example acids obtained from olive oil typically are a mixture of about 83 percent oleic acid, 6 percent palmitic acid, 4 percent stearic acid and 7 percent linoleic acid. This mixture is quite suitable for preparing the organic nitrogen compounds used in this invention. In addition, the organic acid mixtures obtained from babasu oil, castor oil, tall oil, peanut oil, palm oil, and the like, are also useful.

Another type of useful acid is that obtained when an unsaturated acid such as one of those described above is modified by reaction with formaldehyde under acid conditions. This reaction is commonly known as the Prins reaction. The reaction involves the addition of elements of formaldehyde and/or water across the double bond; the product obtained thus is a mixture of various addition products; the acid function is not affected. Thus, the Prins reaction produces a mixture of modified acids which can be used to prepare the organic nitrogen compounds of the present invention. The unsaturated acids which can be formaldehyde modified include all of the acids described above. This encompasses the mixtures of acids obtained from the natural products which contain at least some unsaturated acids. Thus, for example, the Prins reaction products of acids derived from cocoanut oil, tall oil, peanut oil and the like are useful.

The amines which can be used to prepare useful tetrahydropyrimidines and amides are 1,3-propylene diamine and N-substituted 1,3-proylene diamine. They are illustrated by the formula

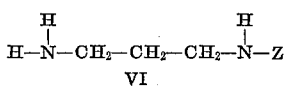

VI wherein Z is selected from hydrogen, 2-aminoethyl, 2-hydroxyethyl and alkyl or alkenyl groups having up to about 20 carbon atoms. Examples of suitable amines are 1,3-propylene diamine, N-gadoleyl-1, 3-propylene diamine, N-dodecyl-1,3-propylene diamine, N-pentadecen-7,8-yl, 1,3-propylene diamine, N-ethyl-1,3-propylene diamine and the like. A preferred amine is N-octadecenyl-1,3-propylene diamine.

The preparation of a tetrahydropyrimidine is presented in the following example. All parts are by weight unless otherwise indicated.

EXAMPLE 1

Reaction equation:

$CH_3—COOH + H_2N—(CH_2)_3—NH—C_{18}H_{35}$ ⟶

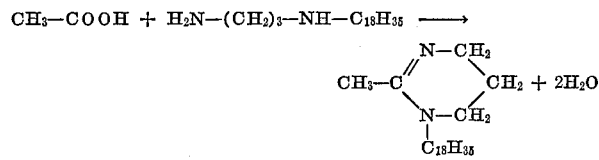

A vessel fitted with a thermometer, stirrer, a Dean-Stark trap and a condenser was charged with 12 parts of acetic acid, 80.4 parts of N-oleyl, 1,3-propylene diamine (Armour's Duomeen-O) and 4.3 parts of xylene. The mixture was heated to reflux (162° C. to 231° C.) with stirring for four hours. During this reaction period, 7.3 parts of water (theory as per equation equals 7.2 parts) were collected.

The product obtained was a clear dark liquid which was a 74 percent solution of 2-methyl-1-octadecenyl-1,4,5,6-tetrahydropyrimidine in xylene. Infrared analysis confirmed the presence of the tetrahydropyrimidine.

The procedure described in Example 1 may be used for preparing tetrahydropyrimidines using any of the acids and amines described above, with equal success. Other procedures known to those skilled in the art may also be used.

The amides which are used in the practice of this invention may be prepared in a similar manner, that is, by reacting the 1,3-propylene diamine with a suitable acid. In this case, however, the reaction is allowed to proceed only to the point where one molecule of water is split out between the acid and the amine.

The linear amides may also be conveniently prepared by hydrolyzing suitable tetrahydropyrimidines. Thus, for example the tetrahydropyrimidine of Example 1 can be hydrolyzed by heating this material in the presence of an excess quantity of water producing the amides N-[3-(oleylamino)-propyl]acetamide and N-(3-aminopropyl) - N-oleylacetamide. As a practical matter, tetrahydropyrimidines generally contain a small quantity of the linear amides.

The organic silicon compounds which are used in this invention are silicones having Formula IV and organic silicates having Formula V. The silicates are esters of orthosilicic acid. The silicates which are useful are the substituted silicates wherein T, $T_1$, $T_2$, $T_3$ in Formula V are hydrocarbyl groups having 1 to about 12 carbon atoms. The hydrocarbyl groups may be alkyl groups such as propyl and the like, or aryl groups such as phenyl and the like.

The alkyl silicates include those in which the alkyl groups are all the same as well as those in which the alkyl groups are different. Examples of the former silicates are propyl silicate, dodecyl silicate, hexyl silicate, tert-butyl silicate, and the like; examples of the latter silicates (which will be referred to as mixed silicates) are diethyl-diisobutyl silicate, propyltripentyl silicate, ethyltriisobutyl silicate and the like. These mixed silicates are generally a mixture of mixed silicates. Thus, for example, a mixed ethyl-tert-butyl silicate would contain all the possible ethyl-tert-butyl silicate combinations. These mixtures of mixed silicates are also useful in the practice of this invention.

A preferred silicate is ethyl silicate.

Silicones used in this invention are polyalkyl- and polyarylsiloxanes. These polysiloxanes are characterized in that the silicon atom is bound directly to a carbon atom in each of two hydrocarbyl radicals and to one oxygen atom which in turn is bound to a second silicon atom. The characteristic structure is illustrated by Formula IV above.

L in Formula IV represents alkyl groups such as methyl, hexyl, dodecyl and the like, aryl groups such as phenyl and the like and mixtures thereof. $L_1$, that is, the terminal group in these polysiloxanes, can be alkyl, aryl, hydroxyl, or ester. Silicones in which L and $L_1$ are methyl are preferred. These preferred silicones are also called polymethylsiloxanes or -silicones. These polymethylsilicones vary in consistency from very low viscosity water-like fluids to thick grease-like materials. Although silicones having Formula IV are useful in general, the polymethylsiloxanes having a viscosity of from about 0.5 to about 100,000 centistokes are preferred. Polymethylsilicone fluid having a viscosity of about 0.6 to about 1.5 centistokes (cs.) is most preferred.

Another embodiment of this invention is an additive concentrate which comprises a mixture of organic silicon compounds and organic nitrogen compounds described above. This mixture is prepared by simply blending the two ingredients. These two ingredients may either be mutually soluble at the desired concentrations or they may not be. In the latter case, the mixture would have to be stirred prior to addition to the gasoline to insure homogeneity. On the other hand, a small amount of suitable solvent may be added to prepare a solution of the immiscible ingredients. Solvents which are useful are aromatic hydrocarbons such as toluene, xylene and the like; paraffinic hydrocarbons such as hexane, dodecane, pentadecane and the like; alcohols such as 2-ethylhexanol, pentanol, isopropanol, ethanol and the like. Commercial mixtures of solvents such as Stoddard solvent are also useful.

The ratio of the organic nitrogen compound to organic silicon compound in the additive mixture may be varied. A suitable blend contains from about 60 to about 95 percent by weight of the organic nitrogen compound and from about 5 to about 40 percent of the organic silicon compound. Although the ratio of the ingredients in this mixture is not critical, the ratio must be such that when added to gasoline, the concentration of organic-silicon and organic nitrogen compounds in the gasoline is within the range taught to be effective herein.

Any gasoline suitable for use in internal combustion engines may be used in the practice of this invention. By gasoline is meant a blend of hydrocarbons boiling from about 25° C. to about 225° C. which occur naturally in petroleum and suitable hydrocarbons made by thermal or catalytic cracking or reforming of petroleum hydrocarbons. Typical base gasolines are listed in Table I.

The improved anti-icing characteristics of the gasoline compositions of this invention were determined by using an automobile engine test. Briefly, the procedure consists of cycling an automobile engine with no load between medium and low speeds using cold moist carburetor intake air. When a sufficient amount of ice forms in the carburetor throttle plate and idle passages, stalling occurs during the low speed portion of the cycle. After the stall, the engine is immediately restarted on the medium speed portion of the cycle. Warm up of the engine is simulated by applying external heat to a specific section below the carburetor. The criteria for evaluating the icing tendency of a fuel is the number of stalls which occur before the warm up is accomplished. The data is reported as percent reduction in stalls using gasoline containing the additive as compared with gasoline containing no anti-icing additive. Following is a table presenting the anti-icing data for the gasoline fuels of this invention.

TABLE II.—ANTI-ICING

| Run | Gasoline containing— | | Amount (p.p.m.) [1] | Reduction in stalls, percent |
|---|---|---|---|---|
| | Organic nitrogen compound | Organic silicon compound | | |
| 1 | None | Dimethylsilicone [2] | 10 | 2 |
| 2 | 2-methyl-1-octadecenyl-1,4,5,6, tetrahydropyrimidine. | None | 37 | 58 |
| 3 | ____do____ | Plus dimethylsilicone [2] | 37+10 | 78 |

[1] By weight.
[2] Dow Corning DC-200 fluid, 100 cs. viscosity.

TABLE I.—BASE GASOLINES

| | A | B | C | D |
|---|---|---|---|---|
| Gravity, ° API | 59.9 | 56.6 | 62.0 | 39.7 |
| Reid vapor pressure, p.s.i | 9.0 | 11.2 | 10.7 | 10.2 |
| Sulfur, percent | .013 | .007 | .054 | .050 |
| Percent aromatics | 27.0 | 34.5 | 19.0 | 24.0 |
| Percent olefins | 11.9 | 8.0 | 18.5 | 12.5 |
| Percent saturates | 62.0 | 57.5 | 62.5 | 63.5 |
| ASTM distillation: | | | | |
| Initial B.P | 100 | 89 | 90 | 88 |
| 10% evaporation, ° F | 128 | 116 | 115 | 116 |
| 30% evaporation, ° F | 166 | 177 | 155 | 165 |
| 50% evaporation, ° F | 210 | 230 | 199 | 213 |
| 70% evaporation, ° F | 250 | 282 | 254 | 274 |
| 90% evaporation, ° F | 310 | 338 | 349 | 355 |
| End point ° F | 396 | 410 | 420 | 432 |

The data in Table II illustrates the unexpected improvement in anti-icing obtained using the additive mixtures of this invention. A small amount of silicone oil in gasoline (Run 1) has virtually no effect as an anti-icer. The tetrahydropyrimidine additive (Run 2) reduces the stalling by 58 percent. Quite unexpectedly, however, the tetrahydropyrimidine plus the silicone oil reduces the stalling by 78 percent. This improved anti-stalling effect is quite clearly synergistic and not additive.

Similar anti-icing results are obtained when the following organic silicon and organic nitrogen mixtures are used.

| (A) Organic nitrogen | (B) Organic silicon | Concentration in gasoline (p.p.m.) [1] (A)/(B) |
|---|---|---|
| 2-nonadecenyl-1-ethyl-1,4,5,6-tetrahydropyrimidine | Dimethylsilicone, 60,000 cs.[2] | 50/5 |
| 2-ethyl-N-[3-(gadoleylamino) propyl] hexanamide | Dimethylsilicone, 0.6 cs.[2] | 200/2 |
| 2-heptadecenyl-1-oleyl-1,4,5,6-tetrahydropyrimidine | Polydiphenylsilicone, 10,000 cs | 100/10 |
| Tetrahydropyrimidine from peanut oil acids/N-(2-hydroxyethyl)-1,3-propylenediamine. | Polydiphenylsilicone, 100,000 cs | 10/1 |
| Amides from tall oil acids/N-lauryl-1,3-propylenediamine | Dodecylsilicate | 15/15 |
| 2-pentadecyl-1-stearyl 1,4,5,6-tetrahydropyrimidine | Ethylsilicate | 75/30 |
| N-(3-aminopropyl)-N-stearylpropionamide | tert-Butylethylsilicate [3] | 30/8 |

[1] By weight.
[2] Dow Corning DC-200 fluid.
[3] Mixture of the mixed silicates.

Note.—Cs.=Centistokes.

Useful concentrations of the organic nitrogen compounds in gasolines of this invention are up to about 200 p.p.m. by weight, with 10 to about 100 p.p.m. preferred; for the organic silicon compounds useful concentrations are up to about 100 p.p.m. by weight, with 1 to about 50 p.p.m. preferred.

In preparing the improved gasolines of the present invention, the organic silicon and organic nitrogen compounds may be conveniently added as concentrates described above. The gasoline compositions can also be prepared by simply adding the individual ingredients to the gasoline. Conventional gasoline blending procedures and apparatus can be used.

The gasoline compositions and additive concentrates of this invention may also contain other commonly used gasoline additives. Examples of other additives are antiknock agents such as tetraethyllead, tetramethyllead, methylcyclopentadienyl manganese tricarbonyl and the like; scavengers such as ethylene bromide, ethylene chloride and the like; antioxidants such as orthoalkylated phenols and aromatic diamines; lead appreciators such as tert-butyl acetate and the like; corrosion inhibitors such as linoleic acid dimer and the like; antiwear additives such as dibutyl phthalate and the like; deposit modifiers such as cresyl diphenyl phosphate and the like; and dyes.

The gasoline compositions and gasoline additive mixtures of the present invention are fully described above.

It is intended that the invention herein described be limited only within the lawful scope of the above disclosure and the claims which follow.

I claim:

1. A gasoline containing as an anti-icing additive the combination of
   (a) from about 25 to about 50 parts per million by weight of an organic nitrogen compound selected from
      (i) tetrahydropyrimidines having the formula

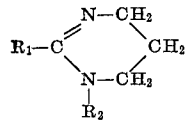

and
      (ii) amides having the formula

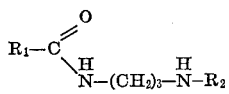

and

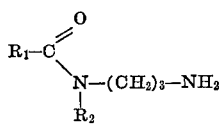

wherein $R_1$ and $R_2$ are independently selected from alkyl and alkenyl radicals having up to about 20 carbon atoms, and
      (iii) mixtures of the (i) tetrahydropyrimidines and (ii) amides and
   (b) from 5 to about 15 parts per million by weight of a silicone having the formula

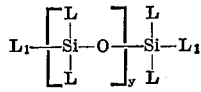

wherein L is independently selected from $C_1$ to $C_{12}$ alkyl groups and $C_6$ to $C_{10}$ aryl groups, $L_1$ is selected from L as defined above and hydroxyl, and $y$ is an integer from 1 to about 20.

2. The gasoline of claim 1 wherein L and $L_1$ are methyl and $y$ is 1 to about 5.

3. The gasoline of claim 1 wherein L and $L_1$ are methyl and $y$ is 1.

4. The gasoline of claim 1 wherein said organonitrogen compounds are a mixture of said tetrahydropyrimidine and said amides wherein $R_1$ is methyl and $R_2$ is octadecenyl.

5. The gasoline additive composition comprising from about 60 to about 90 percent by weight of the organic nitrogen compounds of claim 1 and from about 5 to about 40 percent by weight of the silicone of claim 1.

6. The gasoline of claim 2 wherein said organonitrogen compounds are mixtures of said tetrahydropyrimidine and said amides wherein $R_1$ is methyl and $R_2$ is octadecenyl.

7. The gasoline of claim 3 wherein said organonitrogen compounds are a mixture of said tetrahydropyrimidine and said amides wherein $R_1$ is methyl and $R_2$ is octadecenyl.

8. Gasoline containing about 10 parts per million by weight of a dimethylsilicone having a viscosity of 100 centistokes and about 37 parts per million by weight of 2-methyl-1-octadecenyl-1,4,5,6-tetrahydropyrimidine.

References Cited
UNITED STATES PATENTS

| | | | |
|---|---|---|---|
| 2,706,677 | 4/1955 | Ducan et al. | 44—63 |
| 2,961,308 | 11/1960 | Andress, Jr. | 44—63 |
| 2,974,022 | 3/1961 | Lindstrom et al. | 44—63 |
| 3,033,664 | 5/1962 | Pethrick et al. | 44—63 |
| 3,063,818 | 11/1962 | Sutton et al. | 44—76 |
| 2,765,221 | 10/1956 | Lusebrink et al. | 44—76 |
| 2,809,617 | 10/1957 | Bartleson et al. | 44—76 |
| 2,862,885 | 12/1958 | Nelson et al. | 44—76 |
| 2,986,874 | 6/1961 | George | 44—76 |

DANIEL E. WYMAN, Primary Examiner
Y. H. SMITH, Assistant Examiner

U.S. Cl. X.R.
44—71, 76, DIG. 1